United States Patent [19]

Graff et al.

[11] Patent Number: 5,222,297

[45] Date of Patent: Jun. 29, 1993

[54] COMPOSITE BLADE MANUFACTURE

[75] Inventors: John M. Graff, West Suffield; John A. Violette, Granby, both of Conn.

[73] Assignee: United Technologies Corporation, Hartford, Conn.

[21] Appl. No.: 780,696

[22] Filed: Oct. 18, 1991

[51] Int. Cl.⁵ .............................................. B21K 3/04
[52] U.S. Cl. ................................ 29/889.71; 29/889.7; 416/224
[58] Field of Search .................... 29/889.71, 889.7; 416/224, 230, 241 A, 241 R, 226; 264/103, 46.4, 46.7, 45.1, 279.1

[56] References Cited

U.S. PATENT DOCUMENTS

| 2,511,862 | 6/1950 | Martin . | |
| 2,599,718 | 6/1952 | Munk . | |
| 3,664,764 | 5/1972 | Davies et al. | 416/224 |
| 3,970,495 | 7/1976 | Ashton et al. | 156/162 |
| 4,268,571 | 5/1981 | McCarthy | 428/236 |
| 4,470,862 | 9/1984 | More et al. | 156/245 |
| 4,471,020 | 9/1984 | McCarthy | 428/309.9 |
| 4,524,499 | 6/1985 | Grimes et al. | 29/156.8 |
| 4,648,921 | 3/1987 | Nutter, Jr. | 156/77 |
| 4,789,304 | 12/1988 | Gustafson et al. | 416/226 |
| 4,919,594 | 4/1990 | Wright et al. | 29/889.71 |
| 5,013,216 | 5/1991 | Bailey et al. | 29/889.71 |
| 5,018,271 | 5/1991 | Bailey et al. | 29/889.71 |
| 5,041,182 | 8/1991 | Sekiguchi et al. | 156/245 |
| 5,042,968 | 8/1991 | Fecto | 416/226 |
| 5,049,036 | 9/1991 | Bailey et al. | 29/889.71 |
| 5,123,814 | 6/1992 | Burdick et al. | 29/889.71 |
| 5,127,802 | 7/1992 | Carlson et al. | 29/889.71 |

Primary Examiner—Irene Cuda
Attorney, Agent, or Firm—Willaim W. Habelt

[57] ABSTRACT

A method of manufacturing a lightweight composite propulsor blade of spar and shell construction comprises forming a composite spar (30) having an elongated foam body (20) bonded to a short metal retention tulip (10) and overlayed with a dry braided wrap of angular structural fibers and substantially unidirectional spanwisely aligned structural fiber plies disposed between the braided layers; adding a leading edge foam body (42) and a trailing edge foam body (44) to the spar assembly to form a blade subassembly (50); providing a dry braided fabric wrap over the blade assembly; disposing the fabric covered blade subassembly into a shell molding die and simultaneously impregnating the dry spar fabric wrap and the dry shell fabric wrap with a curable resin material; and curing the impregnated blade subassembly.

3 Claims, 2 Drawing Sheets

COMPOSITE BLADE MANUFACTURE

TECHNICAL FIELD

The present invention relates to the manufacture of fiber reinforced composite bodies of a spar and shell construction and, more specifically, to the manufacture of lightweight propulsor blades, such as propeller blades, prop-fan blades, turbo-fan blades and the like constructed of a composite load bearing spar supporting a composite fiber reinforced shell, by resin transfer molding methods.

BACKGROUND ART

In aircraft applications it is highly desirable to minimize the weight of aircraft components as every pound saved in aircraft weight translates to fuel savings and/or greater payload capacity. With respect to propeller, turboprop or turbofan aircraft engine components, it is well appreciated that the propulsor blades are the most likely candidate for weight reduction since the weights of other related components, e.g. blade retention means, pitch change mechanisms, hub disks, shafts and bearings, are typically directly dependent upon the magnitude of the blade centrifugal loading borne by these components. The propulsor blades per se, however, can be made lighter in weight so long as the centrifugal pull, bending moments, torsion loads and vibratory loads, imposed upon the blades during operation are effectively transmitted to the blade retention means for distribution to the aforenoted load bearing components.

It is known in the art to produce lighter weight propulsor blades of a built-up construction wherein a blade is formed of an outer shell made of lightweight composite material, and an internal load bearing spar which is bonded to the interior surface of the shell and extends from within the shell cavity to terminate beyond the shell in a root end which is adapted to be mounted to a suitable blade retention means. Examples of such composite blades are presented in U.S. Pat. Nos. 3,799,701; 4,784,575 and 4,810,167.

It has become conventional practice in the aircraft industry to manufacture such blades with a shell formed about the load bearing spar as a molded fiber reinforced resin body using resin transfer molding methods. Such fiber reinforced resin shells exhibit high strength and low weight characteristics and in aircraft applications typically offer at least as high strength as corresponding articles made of metal at a substantially lower weight. For, example, commonly assigned U.S. Pat. No. 4,648,921 discloses a method of making a fiber reinforced airfoil shaped propeller blade assembly wherein 4 to 7 layers of woven fiberglass cloth are layed up over a foam underbody which is formed by injecting a lightweight foam material into a mold disposed about an adhesive coated full length metallic spar. After curing, the molded underbody is wrapped in multiple layers of the fibrous reinforcing fiberglass cloth, each of the fiberglass layers being trimmed to its desired contour and then hand stitched, a labor intensive practice, in place over the foam underbody. This subassembly is then placed in a second mold and a synthetic polymeric material such as epoxy resin is injected into the fiber matrix and then cured. Alternatively, the resin may be applied to the fibrous cloth of the wrapped subassembly before it is placed into the curing mold.

As discussed in commonly assigned U.S. Pat. No. 4,470,862, the hand stitching may be eliminated by adhesively bonding each fiberglass layer to the layer therebeneath. To do so, the fiberglass material is provided on its underside with a minute, but effective, amount of thermoplastic adhesive. The material is then trimmed to shape and placed in position over the subassembly. Thereafter the adhesive is activated by heat and pressure by means of an electric resistance heated hand iron applied to the surface of the fiberglass material. Although the use of such adhesive coated fiberglass material does indeed eliminate the need for hand stitching, this method of laying up the fiberglass layers is still quite labor intensive and a seam must still be formed.

A light-weight rotary machine blade comprising a composite spar having a metal root and a surrounding fiber-reinforced composite shell is disclosed in commonly assigned, co-pending application Ser. No. 07/633,566, filed Dec. 24, 1990, of John A. Violette and Charles E. K. Carlson, the entire disclosure of which is hereby incorporated by reference. Also disclosed therein is a method for manufacturing such a composite blade comprising the steps of: installing an elongated core of lightweight cellular foam material into to a receiving cavity defined by the flared distal end of a foreshortened metal spar so as to extend axially outwardly therefrom, thence laying up a laminate fiber wrap of alternating plies of spanwisely oriented graphite fibers and angularly woven plies of high strength aramid fibers about this spar subassembly to form a preliminary composite assembly, thence attaching leading and trailing edge fillers of lightweight foam material to the preliminary composite assembly to form the desired contoured shape of the blade, thereafter laying up a laminate wrap of layered plies of high strength aramid fibers about this entire shaped subassembly except for the root end of the spar, and thence placing the wrapped shaped subassembly into a conforming mold and impregnating the wrapped shaped subassembly with an epoxy resin via resin transfer molding techniques to yield an resin reinforced assembly which upon curing constitutes the lightweight composite blade. Additionally, U.S. Pat. No. 4,524,499 discloses a method of manufacturing a composite propeller blade utilizing a resin impregnated fabric wrap over a composite foam spar having a metal root, and U.S. Pat. Nos. 4,268,571 and 4,471,020 each disclose a method of manufacturing a composite propeller blade of spar and shell construction using dry fabric layup of the shell over a preformed spar subassembly followed by resin injection and curing in a mold.

DISCLOSURE OF INVENTION

It is an object of the present to provide an improved method of manufacturing fiber reinforced propulsor blades of lightweight composite spar and shell construction.

It is a further object of the present invention to provide a method of manufacturing a propulsor blade having a composite spar comprising an elongated foam body bonded to a short metal retention member and overlayed with a dry braided wrap of angularly woven structural fibers and substantially unidirectional spanwisely aligned structural fiber plies disposed between the braided layers.

It is a still further object of the present invention to provide a method of manufacturing a propulsor blade having such a dry braided structural fiber reinforced composite spar disposed in a shell formed of at least one layer of dry braided fabric warp to form a subassembly which is subsequently placed into a die into which a resin is injected to simultaneously impregnate the spar fabric and the shell fabric via resin transfer molding.

In accordance with the present invention, there is provided a method of manufacturing a lightweight composite propulsor blade of spar and shell construction comprising the steps of: forming a composite spar having an elongated body of lightweight cellular material, such as foam, bonded to a short metal retention member and overlayed with a dry braided wrap of angular structural fibers and substantially unidirectional spanwisely aligned structural fiber plies disposed between the braided layers; adding a leading edge body of lightweight cellular material, such as foam, and a trailing edge body of lightweight cellular material, such as foam, to the composite spar assembly to form a blade subassembly; providing a dry braided fabric wrap over the blade assembly; disposing the fabric covered blade subassembly into a shell molding die and simultaneously impregnating the dry spar fabric wrap and the dry shell fabric wrap with a curable resin material; and curing the impregnated blade subassembly. Advantageously, a protective sheath of an erosion resistant material, for example nickel, titanium or like materials, is bonded to the leading edge of the blade subassembly prior to placing the blade subassembly into the shell molding die for impregnation. A lightning protection strip, for example a mesh or strap of a conductive metal, such as copper or aluminum, extending spanwisely from the blade tip to the metal retention member at the root of the blade, may also be bonded to the blade subassembly prior to placing the blade subassembly into the shell molding die for impregnation. Following curing, a deicing blanket may be bonded to the blade assembly and a the blade assembly painted with a polyurethane coating to provide an erosion film over the entire blade.

Fabrication of the blade subassembly may be facilitated by disposing the braided spar assembly into a molding die and injecting a lightweight cellular material, such as foam, into the die to fill the cavity thereby forming the leading and trailing edge foam fillers bonded to the spar assembly. The step of providing a dry fabric wrap about the blade subassembly may be readily accomplished by fitting at least one, and advantageously two or more, dry preformed braided fabric cloth sock over the blade subassembly.

BRIEF DESCRIPTION OF DRAWING

These and other objects, features and advantages of the present invention will become more apparent in light of the detailed description of a preferred embodiment thereof with reference to the accompanying drawing wherein.

BEST MODE FOR CARRYING OUT THE INVENTION

The present invention will be described hereinafter in greater detail as applied to the manufacture of a composite lightweight blade for use on an aircraft propulsor, such as a propeller driven by a turbine engine. However, it is to be understood that the present invention relates to the manufacture of any type of composite, lightweight propulsor blade, whether it is termed a propeller, a turboprop, or a fan blade and irrespective of the whether the propulsor on which the blade is to be used comprises a propeller engine, a turboprop engine, a ducted or unducted turbofan engine, or other type of bladed propulsor.

The first step of the method of the present invention is to form a spar subassembly comprising an elongated foam body bonded to a short metal retention member. Next, this spar subassembly is mounted in a braiding machine as a mandrel over which dry structural fibers are angularly woven by braiding. A number of layers of braided fiber are overlayed on the spar subassembly so as to build up a wrap of structural fibers to a desired thickness. To improve the bending stiffness of the spar, a layer of dry unidirectional spanwisely aligned structural fiber plies may be disposed between successive woven layers as applied during this braiding step.

Following braiding, the completed spar assembly is disposed in a molding die comprised of mating mold halves, which are contoured over their facing interior surfaces to a desired airfoil configuration, and a lightweight cellular material, e.g. foam, is injected into the molding die so as to fill the cavities between the centrally disposed spar assembly and the interior surfaces of the surrounding mold halves thereby forming a blade subassembly having lightweight trailing and leading edge fillers bonded to the braided spar assembly. Thereafter, a dry wrap of angularly woven fabric is laid up over the blade assembly, most advantageously by fitting at least one dry preformed braided fabric cloth sock over the blade subassembly. This fabric covered blade subassembly is disposed in an impregnation die formed of two mold halves, the interior surfaces of which substantially conform to the shape of the fabric covered blade subassembly, for subsequent impregnation with a resin material. Prior to placing the prepregnation blade subassembly into the impregnation die, a protective sheath of an erosion resistant material and a lightning protection strip may be bonded to the leading edge of the prepregnation blade subassembly.

With the blade assembly disposed in the impregnation die, an epoxy resin is injected into the die and resin transfer molded into both the spar fiber wrap and the braided fabric shell wrap via curing under heat and pressure in a manner well known in the art. Following curing, a deicing blanket may be bonded to the blade assembly and the blade assembly painted with a polyurethane coating to provide an erosion film over the entire blade.

Figure 1:
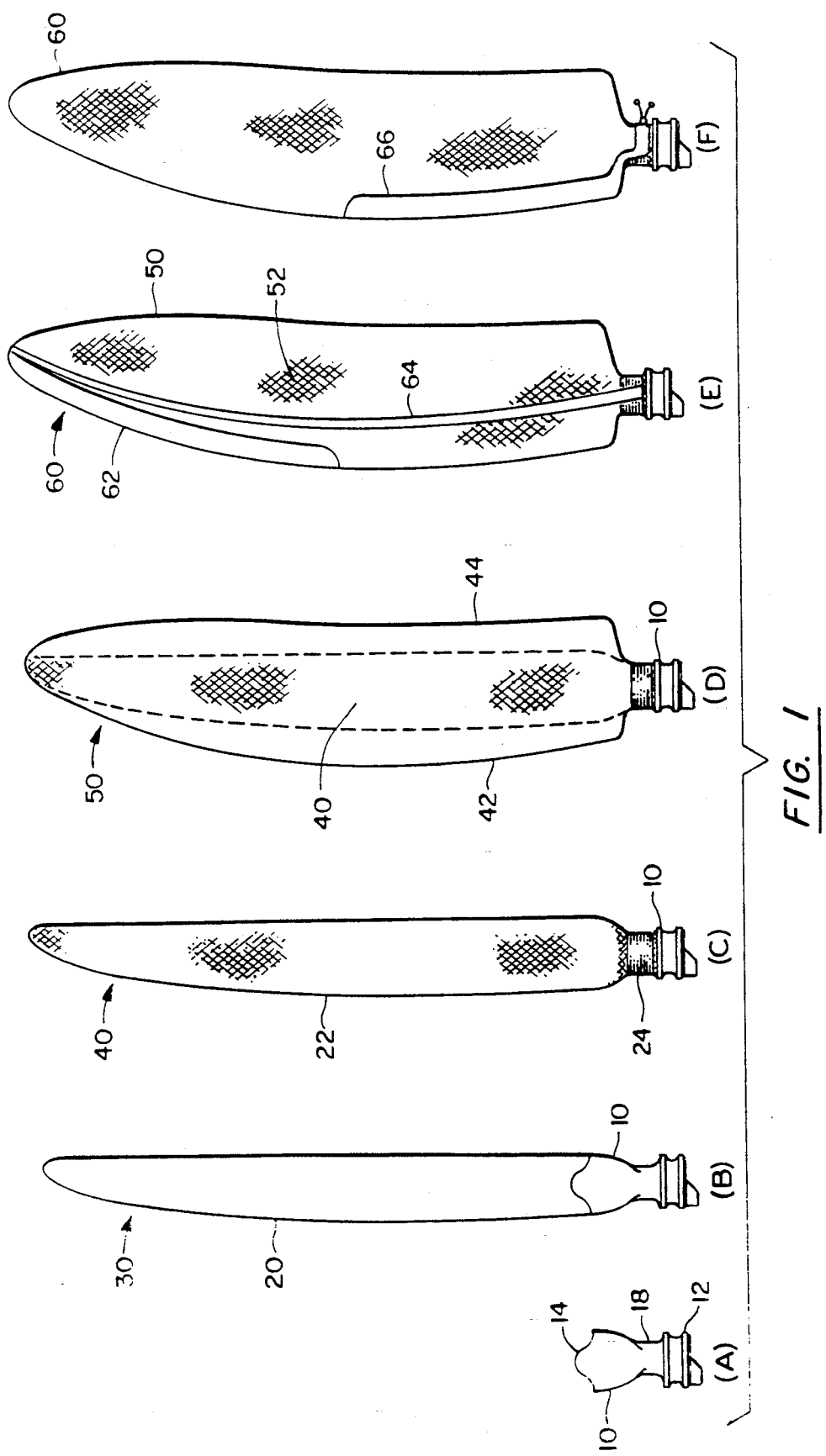
FIGS. 1a-f are diagrammatic views illustrating the manufacture of a propeller blade in accordance with the method of the present invention.
Figure 2:
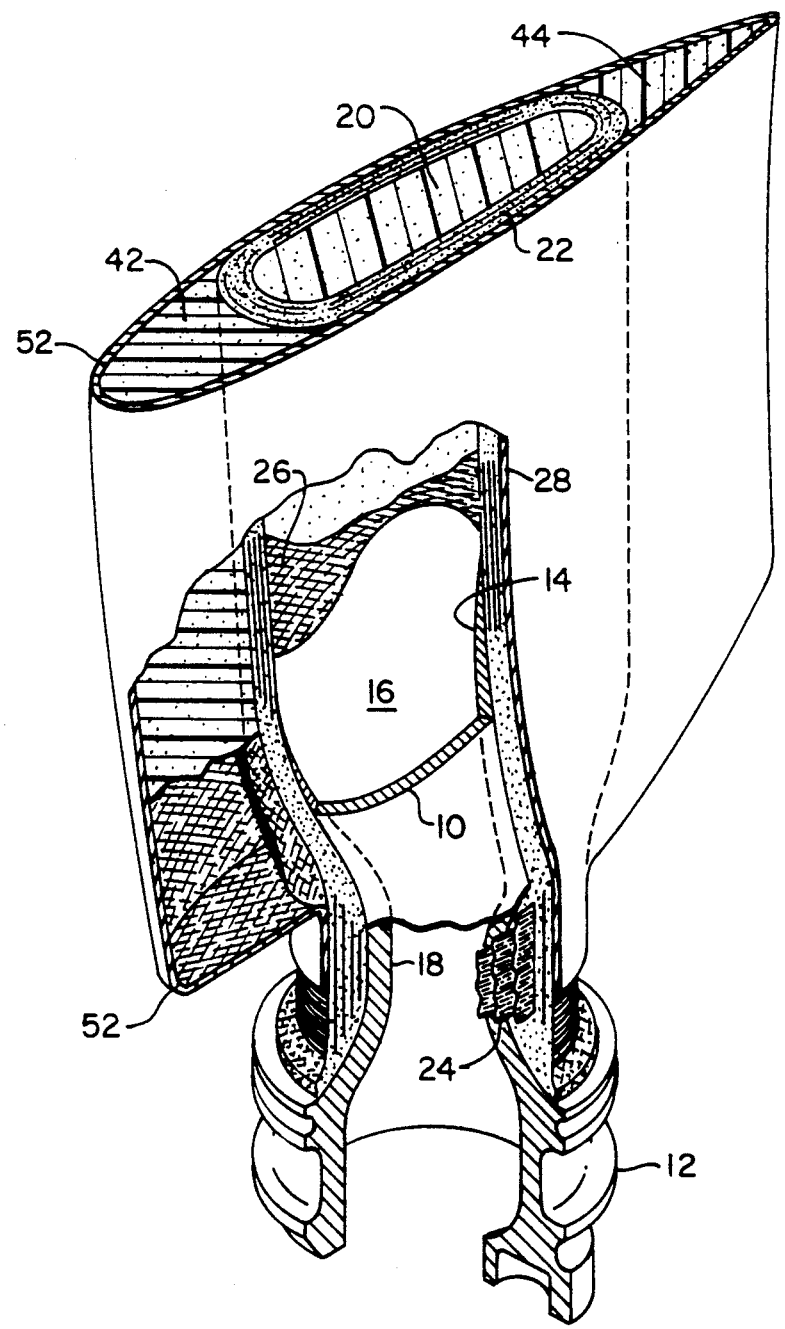
FIG. 2 is a partially sectioned, perspective view illustrating the proximal portion of a propeller blade manufactured in accordance with the present invention.

Referring now to FIGS. 1 and 2, the method of the present invention will be described with respect to the manufacture of a propeller blade. A metal retention member, advantageously comprising for example a retention tulip 10, is formed by conventional techniques from steel, aluminum, titanium or other suitably strong metal or composite material, with a proximal end 12 which is adapted to provide a retention structure for mounting into a propeller hub (not shown) and a distal end 14 which is flared to provide a tulip like cavity 16 opening axially outward. The retention tulip 10 may advantageously be formed with a neckdown region 18 intermediate its proximal and distal end for purposes of securing the subsequently applied braided wrap in a manner to be discussed later. After the retention tulip 10 is treated for corrosion protection by conventional techniques, an adhesive is applied in the inner surface of the retention tulip 10 bounding the cavity 16 and a preformed core 20 of lightweight cellular material, such as a polyurethane foam, a polyisocyanurate foam or other lightweight foam material, is mounted to the retention tulip 10 by inserting the proximal end of the foam core 20 into the cavity 16 to be adhesively bound to the surrounding surface of the retention tulip 10. The adhesive may comprise any commercial adhesive having a strength and toughness compatible with the foam material of the preformed core 20 and the impregnation resin to be used. The distal end of the foam core 20, which extends axially outwardly therefrom for a length substantially equal to the desired length for the completed blade, is preformed by conventional techniques to a desired contour for the spar.

To complete the manufacture of the spar, the spar subassembly 30 is placed in a braiding machine of a commercially available type to serve as a mandrel on which a dry, multi-layer woven fiber wrap 22 is laid-up. The dry fiber wrap 22 comprises a plurality of layers 26 of angularly woven structural fibers, such as for example IM7 brand graphite fibers from Hercules Aerospace or equivalent commercially available graphite fibers, Kevlar aramid fibers from DuPont Nemours & Company or equivalent aramid fibers, fiberglass fibers or combinations thereof, which are braided over the length of the spar subassembly from the neckdown region 18 of the retention tulip 10 to the tip of the distal end of the foam core 20. A circumferential band 24 of such structural fibers is wound about each braided layer 26 at the neckdown region 18 of the retention tulip 10 to ensure a high strength locking of each braided layer to the retention tulip 10. Further, to enhance and improve the spanwise stiffness and strength of the blade, dry plies 28 of substantially unidirectional structural fibers are laid-up during the braiding process between successive braided layers 26. The structural fibers of the plies 28 may also comprise fibers, such as IM7 brand graphite fibers from Hercules Aerospace or equivalent commercially available graphite fibers, Kevlar aramid fibers from DuPont Nemours & Company or equivalent aramid fibers, fiberglass fibers or combinations thereof.

Next, a blade subassembly 50 is formed by adding a leading edge filler 42 of lightweight cellular material and a trailing edge filler 44 of lightweight cellular material to the leading and trailing edges, respectively, of the dry braided composite spar subassembly 40. Although these fillers 42 and 44 may be preformed and bonded with adhesive to the dry braided spar composite spar subassembly 40, they may be advantageously formed in place by injection molding. To do so, the dry braided composite spar assembly 40 is placed in a molding die (not shown) having a base half and a cover half which when closed define a first mold cavity adjacent the leading edge of the spar assembly 40 and a second mold cavity adjacent the trailing edge of the spar assembly 40. A light weight, low density cellular material, such as for example polyurethane foam, polyisocyanurate foam or the like, is thence injected in the molding die via conventional injection molding techniques to fill the mold cavities, thereby forming a blade subassembly 50 comprising the spar assembly 40 with leading edge and trailing edge foam fillers 42 and 44 mounted thereto. The interior surfaces of the mold base half and the mold cover half are contoured to the desired shape for the contour of the blade. To improve bonding, the dry braided composite spar assembly 40 may be coated from the retention tulip to the spar tip with an adhesive material compatible with the foam filler material prior to applying the foam filler material. Alternatively, the dry braided composite spar assembly 40 may be covered with a layer of resin impregnated, adhesive coated prepreg fabric as a means of enhancing the bonding between the foam fillers and spar subassembly. Additionally, the interior surfaces of the molding die halves may also be coated with the adhesive material prior to injection of the foam material into the die.

The blade subassembly 50 is next covered with at least one, and typically two or more, preformed braided socks 52 of dry angularly woven fibers, such as commercially available fiberglass fibers, IM7 brand graphite fibers from Hercules Aerospace or equivalent commercially available graphite fibers, Kevlar aramid fibers from DuPont Nemours & Company or equivalent aramid fibers, or combinations thereof, which are fitted over the blade subassembly 50 much like a sock is fitted over a foot. Next, a protective sheath 62 of an erosion resistant material, for example a nickel or titanium sheath, is bonded to the leading edge of the dry fabric sock covered blade subassembly 60 and lightning strips 64, for example a mesh or a braided strap of a conductive metal such as copper or aluminum, extending from the metal retention tulip to the blade tip are bonded to both sides of the blade subassembly 60.

Thereafter, the dry fabric sock covered blade subassembly is placed in an impregnation die (not shown) and an epoxy resin, such as for example a bisphenol-A resin or a fluorene based resin, is injected therein so as to simultaneously impregnate via resin transfer molding both the braided graphite fiber wrapped spar and the dry braided fabric sock covering the blade subassembly. The epoxy resin advantageously comprises an epoxy resin having a high degree of fracture toughness, for example PR500 epoxy polymer commercially available from 3M Company, which upon curing provides a fiber reinforced shell having enhanced foreign object damage resistance and being less sensitive to the presence of defects. After curing by applying heat and pressure as in conventional practice, a composite blade assembly is formed having a composite fiber reinforced spar and a composite fiber reinforced shell thereabout. After curing, the blade assembly is removed from the impregnation die and a deicing blanket 66 may be bonded as in conventional practice to the blade assembly before the blade assembly is painted with a conventional erosion resistant material to provide an erosion resistant film over the entire blade.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method of manufacturing a lightweight composite propulsor blade having an axially extending load bearing spar disposed within a fiber reinforced shell comprising the steps of:
   a. forming a spar subassembly having a short metal retention member and a core of lightweight cellular material extending axially outwardly from the retention member;
   b. repeatedly braiding fibers of a structural fiber over the length of the spar subassembly to provide a dry wrap about the spar subassembly formed of a plurality of layers of angularly woven structural fibers;

c. during said spar braiding step, laying up spanwisely extending plies of substantially unidirectional structural fibers between successive angularly woven layers;

d. forming a first filler body of lightweight cellular material on a leading edge of the braided spar assembly and a second filler body of lightweight cellular material on a trailing edge of the braided spar assembly to form a blade subassembly;

e. forming a dry shell warp of braided angularly woven fabric about the blade subassembly; and f. simultaneously impregnating the dry braided fiber wrap of the braided spar assembly and the dry braided fabric shell wrap about the blade subassembly with a curable resin material whereby upon subsequent curing of the resin material a blade assembly having a composite fiber reinforced load bearing spar and composite fiber reinforced shell is formed.

2. A method as recited in claim 1 wherein the step of forming a dry shell wrap of braided angularly woven fabric about the blade subassembly comprises fitting at least one dry preformed braided fabric sock over the blade subassembly.

3. A method as recited in claim 2 wherein the step of forming a first filler body of lightweight cellular material on a leading edge of the braided spar assembly and a second filler body of lightweight cellular material on a trailing edge of the spar assembly to form a blade subassembly comprises:

a. disposing the braided spar assembly into a molding die; and b. injecting a lightweight cellular material into the molding die to form the leading edge foam filler and the trailing edge foam filler on the braided spar subassembly.

* * * * *